Patented Jan. 9, 1923.

1,441,951

UNITED STATES PATENT OFFICE.

DAVID STERNLIEB, DECEASED, BY FRIEDERIKE STERNLIEB, ADMINISTRATRIX, OF VIENNA, AUSTRIA.

PLASTIC PACKING MATERIAL FOR STUFFING BOXES.

No Drawing. Application filed February 16, 1922. Serial No. 537,076.

*To all whom it may concern:*

Be it known that I, Mrs. FRIEDERIKE STERNLIEB, a citizen of the Republic of Austria, residing at Vienna, Austria, say that I am the administratrix of the estate of Mr. DAVID STERNLIEB, deceased, who has invented a new and useful Improvement in Plastic Packing Material for Stuffing Boxes, of which the following is a specification.

This invention relates to a plastic packing material for stuffing boxes consisting of a granulated metal, a fatty substance and fibrous, flaky or pulverulent filling material such as hemp, cotton or asbestos, flaky graphite and chalk talc or the like.

Plastic packings of this class as heretofore prepared have proved unsuccessful because they could not keep the stuffing boxes sufficiently light. If the metal in the plastic packings as heretofore proposed was in the form of a fine powder, it was blown out and if it was in the form of comparatively large solid grains either spherical or angular or irregular in shape it offered no sufficient support for the fibrous, flaky and pulverulent filling materials and the fatty substance so that the latter were liable to be blown out. In either case the tightness of the stuffing box was soon destroyed. Moreover the rod moving in the stuffing box was subjected to rapid wear by the fibrous or granular constituents of the packing material and this also contributed to the stuffing box rapidly losing its tightness.

The object of this invention is to obviate these inconveniences and to provide a plastic packing for stuffing boxes which will keep perfectly tight even under severe conditions of use for a long time. With this object in view this invention consists in a new composition to be used as a packing material for stuffing boxes, such composition consisting of granulated spongy metal or metal sponge, as distinguished from solid metal grains, fatty substances preferably oils, flaky graphite and pulverulent filling substances such as chalk.

A further object of this invention is to provide a simple and efficient process of manufacturing the granulated spongy metal, this process consists in pouring molten metal in portions into a suitable receptacle preferably partly filled with flaky graphite and thoroughly and continuously stirring until the metal solidifies by cooling. Preferably 100 parts by weight of metal are poured into 5 parts by weight of flaky graphite. By this thorough and continuous stirring of the metal while cooling and more particularly in the presence of flaky graphite the metal is apparently in part converted into a dense froth or kish similarly as eggs are converted into froth by whipping or whisking. This froth or kish solidifies in the form of spongy grains of irregular shape and size, while the remainder of the metal not converted into kish solidifies in the form of practically solid hemps which may be remelted. The metal sponge grains so obtained, those of a size of 1 to 3 millimeters are most suitable for the present purpose, are then intimately mixed with flaky graphite, chalk, preferably chalk containing marl and oil. The following proportions have proved preferable: spongy metal grains, 100 parts by weight, chalk containing marl 18 parts by weight, flaky graphite 5 parts by weight and rape or colza oil 4 parts by weight.

By means of a comparatively slight pressure as exerted on tightening the gland of the stuffing box this plastic mass is compressed so as to form a compact body perfectly impervious to water, steam and gas. Owing to the spongy nature of the metal grains they are capable of being so consolidated and deformed by pressure and brought into such intimate contact with each other that the oil and the filling material is firmly enclosed and held between the individual spongy grains that neither of them is blown out even under heavy pressures and therefore the stuffing box keeps perfectly tight for a long time even under severe conditions of working. Thus it had been found that stuffing boxes of locomotives in continuous use provided with the present packing have kept perfectly tight without any repair for 8 months and a large steam hammer stuffing box provided with the present packing was in perfect order after a continuous use of three months. Such results could not be obtained with any stuffing box packing heretofore proposed.

Any metal having a sufficiently high melting temperature may be used for manufacturing the spongy metal grains. In case of medium temperatures such as for steam engines operated by saturated or superheated steam an alloy of lead and antimony is preferred. For higher temperatures ordinary bearing metal or aluminium may be used.

Claims.

1. A composition of matter to be used as a packing for stuffing boxes consisting of an intimate mixture of oil, chalk, flaky graphite and spongy grains of metal.

2. A composition of matter to be used as a packing for stuffing boxes consisting of an intimate mixture of oil, chalk, flaky graphite and spongy grains of metal in which grains flaky graphite is incorporated.

3. A composition of matter to be used as a packing for stuffing boxes consisting of an intimate mixture of oil, chalk, flaky graphite and spongy grains of an alloy of lead and antimony.

4. A composition of matter to be used as a packing for stuffing boxes consisting of an intimate mixture of oil, chalk, flaky graphite and spongy grains of an alloy of lead and antimony in which grains flaky graphite is incorporated.

5. As a new article of manufacture a spongy granulated metal the grains having incorporated in them flaky graphite for plastic packing material.

6. As a new article of manufacture a spongy granulated alloy of lead and antimony the grains having incorporated in them flaky graphite.

In testimony whereof I have signed my name to this specification in the presence of two subscribing witnesses.

FRIEDERIKE STERNLIEB,
*Administratrix of David Sternlieb, deceased.*

Witnesses:
   CARL CONDENHORY,
   JOSEF GURMANN.